United States Patent
Wagner et al.

(10) Patent No.: US 7,431,011 B2
(45) Date of Patent: Oct. 7, 2008

(54) METHOD AND DEVICE FOR DIAGNOSING AND CONTROLLING COMBUSTION INSTABILITIES IN INTERNAL COMBUSTION ENGINES OPERATING IN OR TRANSITIONING TO HOMOGENEOUS CHARGE COMBUSTION IGNITION MODE

(75) Inventors: Robert M. Wagner, Knoxville, TN (US); Charles S. Daw, Knoxville, TN (US); Johney B. Green, Knoxville, TN (US); Kevin D. Edwards, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 132 days.

(21) Appl. No.: 11/670,485

(22) Filed: Feb. 2, 2007

(65) Prior Publication Data
US 2007/0181096 A1    Aug. 9, 2007

Related U.S. Application Data

(60) Provisional application No. 60/765,521, filed on Feb. 6, 2006, provisional application No. 60/828,095, filed on Oct. 4, 2006.

(51) Int. Cl.
*F02B 3/00* (2006.01)
*G06F 17/00* (2006.01)
*F02D 41/00* (2006.01)

(52) U.S. Cl. ..................................... 123/299; 701/104
(58) Field of Classification Search ................. 123/299, 123/295, 300, 568.11, 568.21; 701/103–105
See application file for complete search history.

(56) References Cited

U.S. PATENT DOCUMENTS

| | | | |
|---|---|---|---|
| 5,921,221 A | 7/1999 | Davis et al. | |
| 6,390,054 B1 * | 5/2002 | Yang | ........................ 123/295 |
| 6,912,992 B2 * | 7/2005 | Ancimer et al. | ............. 123/299 |
| 6,978,771 B2 * | 12/2005 | Kuzuyama et al. | ..... 123/568.11 |
| 7,168,420 B1 | 1/2007 | Yang | |
| 7,290,522 B2 * | 11/2007 | Heywood et al. | ........... 123/300 |

\* cited by examiner

*Primary Examiner*—Hieu T Vo
(74) *Attorney, Agent, or Firm*—Edna I. Gergel

(57) ABSTRACT

This invention is a method of achieving stable, optimal mixtures of HCCI and SI in practical gasoline internal combustion engines comprising the steps of: characterizing the combustion process based on combustion process measurements, determining the ratio of conventional and HCCI combustion, determining the trajectory (sequence) of states for consecutive combustion processes, and determining subsequent combustion process modifications using said information to steer the engine combustion toward desired behavior.

14 Claims, 14 Drawing Sheets

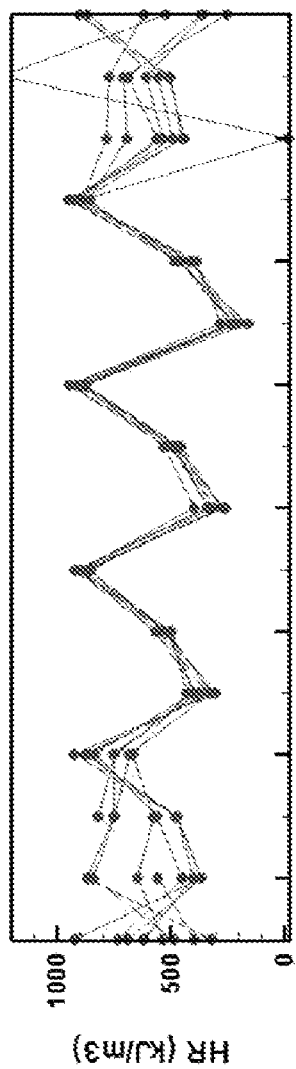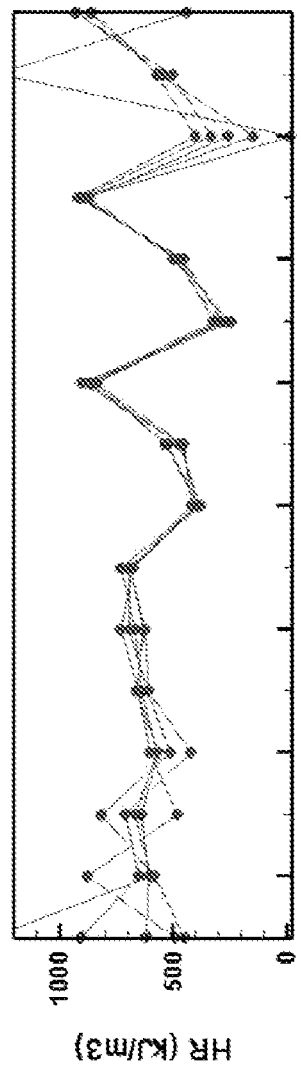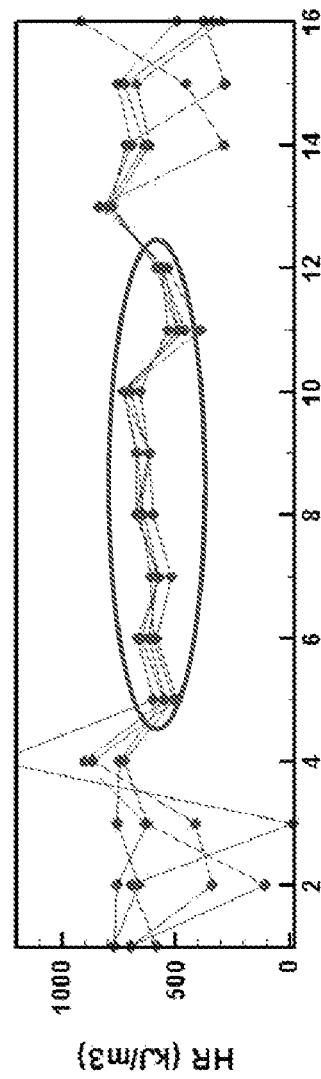

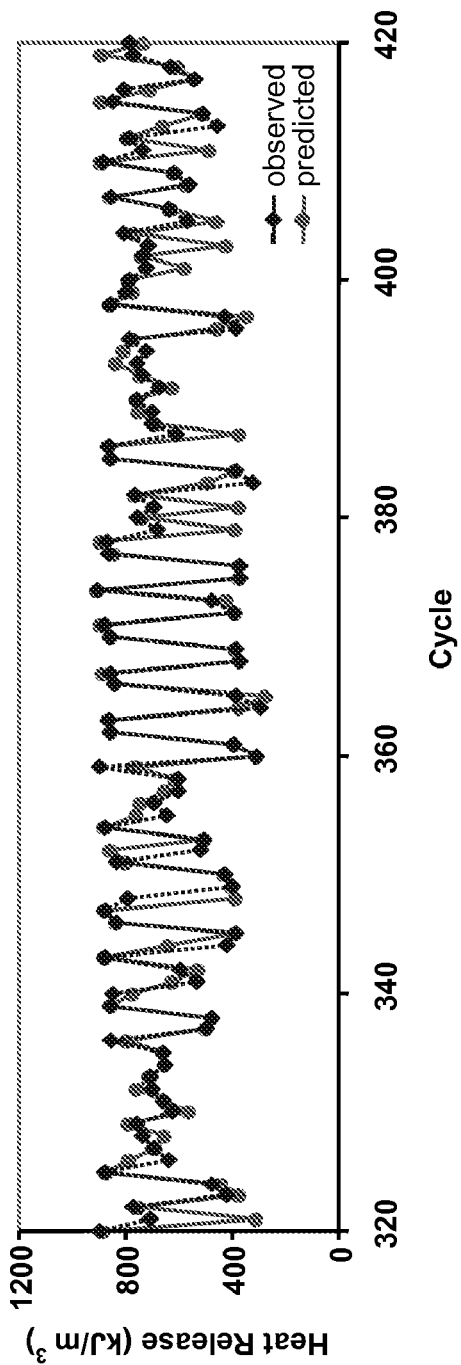
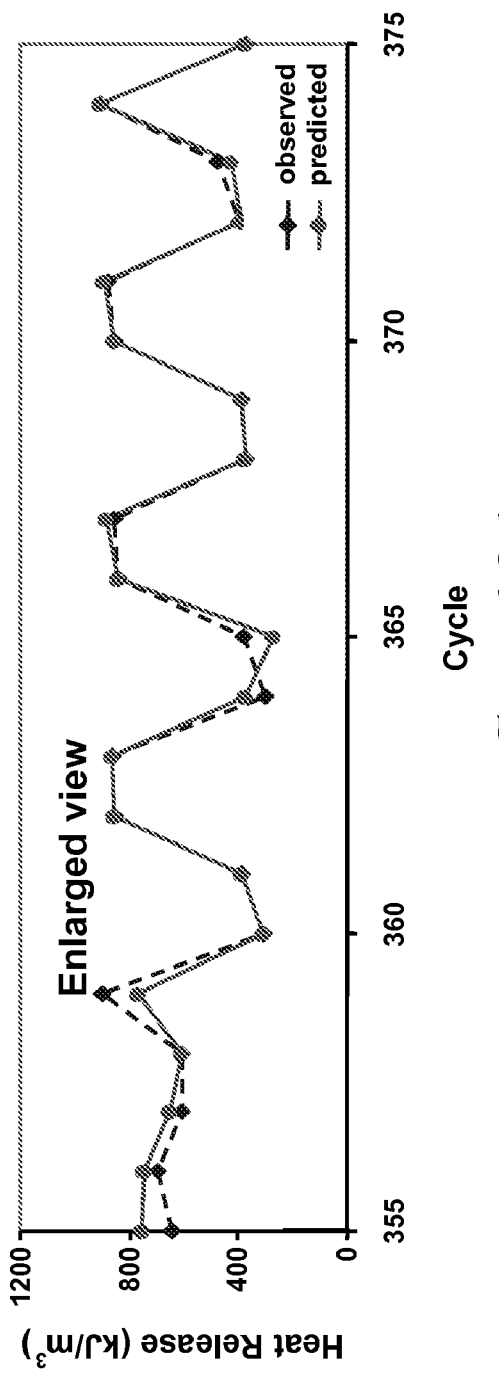
Fig. 12a
Fig. 12b

METHOD AND DEVICE FOR DIAGNOSING AND CONTROLLING COMBUSTION INSTABILITIES IN INTERNAL COMBUSTION ENGINES OPERATING IN OR TRANSITIONING TO HOMOGENEOUS CHARGE COMBUSTION IGNITION MODE

CROSS-REFERENCE TO RELATED APPLICATIONS

This application claims priority to U.S. Provisional Patent Applications 60/765,521 filed Feb. 6, 2006, and 60/828,095 filed Oct. 4, 2006, both herein incorporated by reference. This application is related to U.S. utility patent application Ser. No. 11/380,019 filed Apr. 25, 2006, and U.S. Pat. No. 5,921,221 issued Jul. 13, 1999, both herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

Homogeneous Charge Combustion Ignition (HCCI) is an advanced form of internal engine combustion that offers important potential advantages in reduced emissions and higher fuel efficiency compared to conventional spark ignition (SI) combustion. However, practical utilization of HCCI for transportation requires overcoming significant technical barriers in stabilizing HCCI and controlling engine transitions between HCCI and SI. While SI combustion is likely to remain a basic feature of future engines, maximizing the range of speed and load at which HCCI is possible will be key to realizing their full potential. Increased HCCI implementation is a difficult challenge because HCCI is much more sensitive than SI to small changes in the initial in-cylinder charge conditions. In addition, uncontrolled HCCI can create unacceptable in-cylinder pressure rise rates that structurally damage the engine. Finally, realistic driving conditions require frequent transitions between HCCI and SI, which, without proper control, can result in severe upsets in engine performance and emissions.

The sensitivity of HCCI to small perturbations makes maximizing its operating limits and managing mode transitioning between SI and HCCI a difficult problem. However, there are good reasons to expect that these goals can be achieved in practical engines because the dominant instabilities in HCCI are deterministic, and thus predictable. The deterministic nature of HCCI instabilities have only been recently revealed in methodical experimental studies. Although the transition between SI and HCCI is very nonlinear, it exhibits very characteristic features of low-dimensional, deterministic bifurcation processes similar to those seen in other engineering processes. The fact that many of these other bifurcation processes have been successfully controlled by utilizing tools from the science of nonlinear dynamics suggests that there is hope for doing the same with HCCI.

BRIEF DESCRIPTION OF THE INVENTION

This invention is a method of achieving stable, optimal mixtures of HCCI and SI in practical gasoline internal combustion engines comprising the steps of: characterizing the combustion process based on combustion process measurements, determining the ratio of conventional and HCCI combustion, determining the trajectory (sequence) of states for consecutive combustion processes, and determining subsequent combustion process modifications using said information to steer the engine combustion toward desired behavior. Combustion process measurements can be direct or inferred through calculation or prediction. Combustion process measurements can be at least one of; in-cylinder pressure, carbon dioxide, carbon monoxide, hydrocarbons, nitrogen oxides, oxygen, net heat release over the entire power stroke, and indicated mean effective pressure over the entire power stroke. Combustion process modifications can be at least one of; modifying ignition timing and strength, valve timing and lift, EGR quantity, and injection timing and pressure.

BRIEF DESCRIPTION OF THE DRAWINGS

FIG. 5 illustrates three different combustion sequences at an intermediate EGR level. The first two plots, (a) and (b), reflect undesirable behavior in which the combustion amplitude oscillates over very large values from one cycle to the next. In (c), there is a sequence of successive cycles in which the combustion stays close to its optimal value. With the proper control feedback, this optimal combustion magnitude indicates a potentially good control target.

FIG. 11 illustrates how a simple deterministic model based on the CE function described above can produce behavior that closely mimics the experimental unstable combustion patterns in the SI-HCCI transition.

FIG. 12a and 12b illustrate how the deterministic pattern in combustion variations can be used to make predictions. The points indicated in blue are experimental integrated heat release measurements of combustion strength for several cycles at an intermediate EGR level in the SI-HCCI transition. The red points are predictions based on statistical patterns 'learned' and built into a simple model at a previous time for the same operating condition. Such models can be continuously updated and adapted as engine conditions change.

DETAILED DESCRIPTION OF THE DRAWINGS

The experimental platform used an AVL Powertrain single-cylinder research engine with the following specifications and conditions; 0.5L, 11.34CR; port fuel injection; spark ignition; fully variable valve actuation; capable of HCCI, mixed mode, and conventional operation; HCCI controlled by intake and exhaust valve timing and lift with early exhaust closing and negative overlap strategy; internal EGR increased to transition to HCCI. All experiments were performed at near-stoichiometric conditions with internal EGR sweeps for three speed-load combinations (1200 rpm, 2.5 bar; 1600 rpm 3.0 bar; 2400 rpm, 4.5bar), two spark timings at 1600 rpm, 3.0 bar, and three coolant temperatures at 1600 rpm, 3.0 bar. The mode transition experiments were Conventional-to-HCCI-to-Conventional at 1600 rpm, 3.0 bar. Data from the research engine and speed/load conditions described above were used to illustrate the analysis and control methods described in this document. These methods are not unique to this engine platform or operating conditions.

Figure 1:
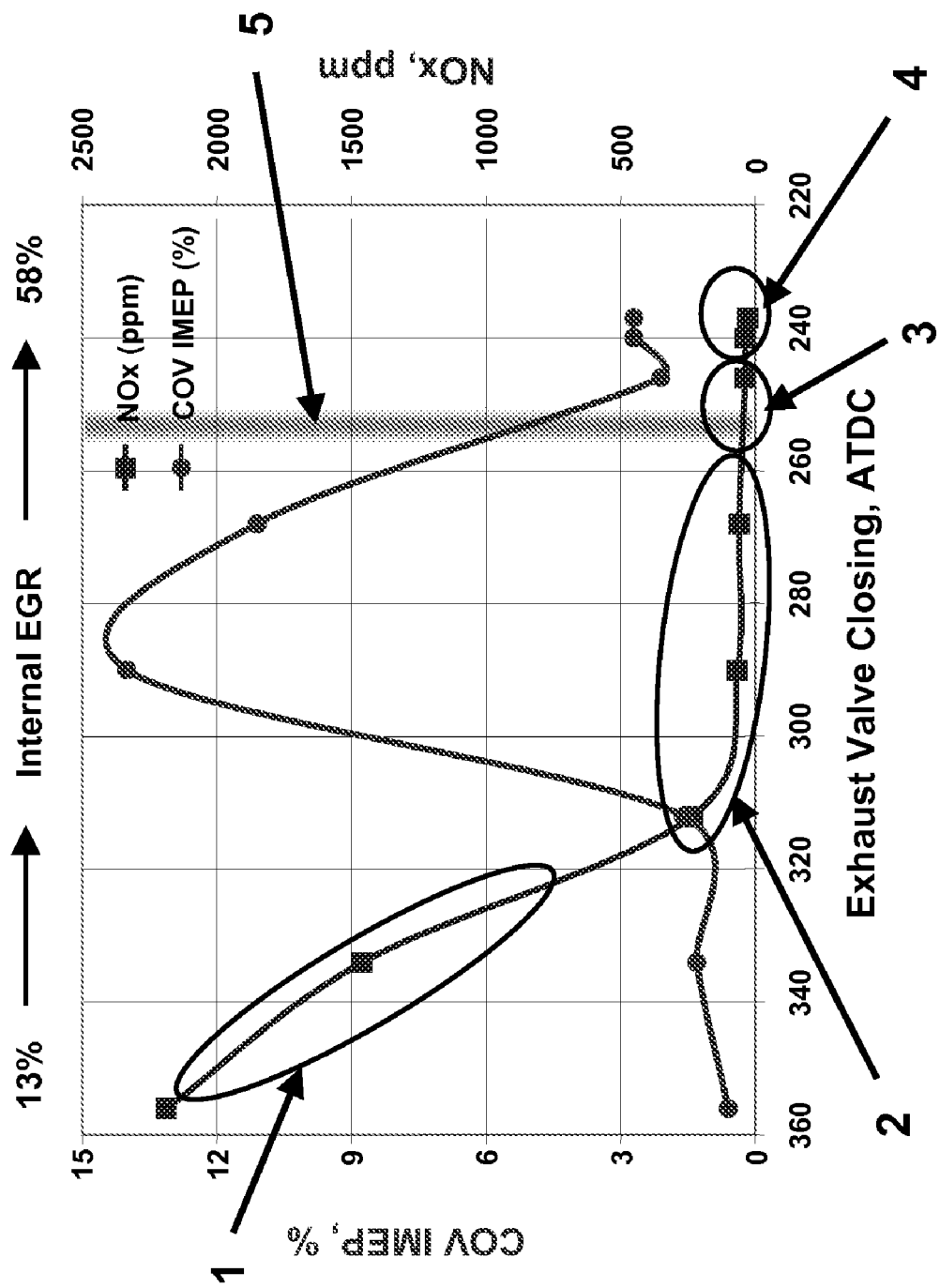
FIG. 1 is a graph showing the transition between SI and HCCI combustion as internal EGR (a key engine parameter) is incrementally increased (as indicated on the horizontal axis) on a single-cylinder engine. On the left vertical axis is the coefficient of variance (COV) of the measured in-cylinder peak pressure. On the right vertical axis is the level of nitrogen oxide pollutants (NOx) in the engine exhaust. At low levels of EGR (left side of the plot), SI combustion occurs and the NOx emissions are high. At the highest levels of EGR, HCCI combustion occurs and NOx emissions are almost zero. At intermediate EGR levels between these limits, variable amounts of both HCCI and SI occur unstably over time, resulting in high COV and poor, erratic power output from the engine. NOx remains relatively low for the intermediate EGR zone.

The graph in FIG. 1 shows the transition to HCCI with internal EGR and reveals modes with low NOx emissions. Nominal operating conditions are 1600 rpm, 3.4 bar IMEP with no feedback control. 1 is the conventional combustion zone. 2 is the transition zone that requires spark ignition. 3 is the spark-assisted HCCI zone. 4 is the no-spark HCCI zone. 5 is a region where there is discontinuity between transition range and spark assisted HCCI.

Figure 2:
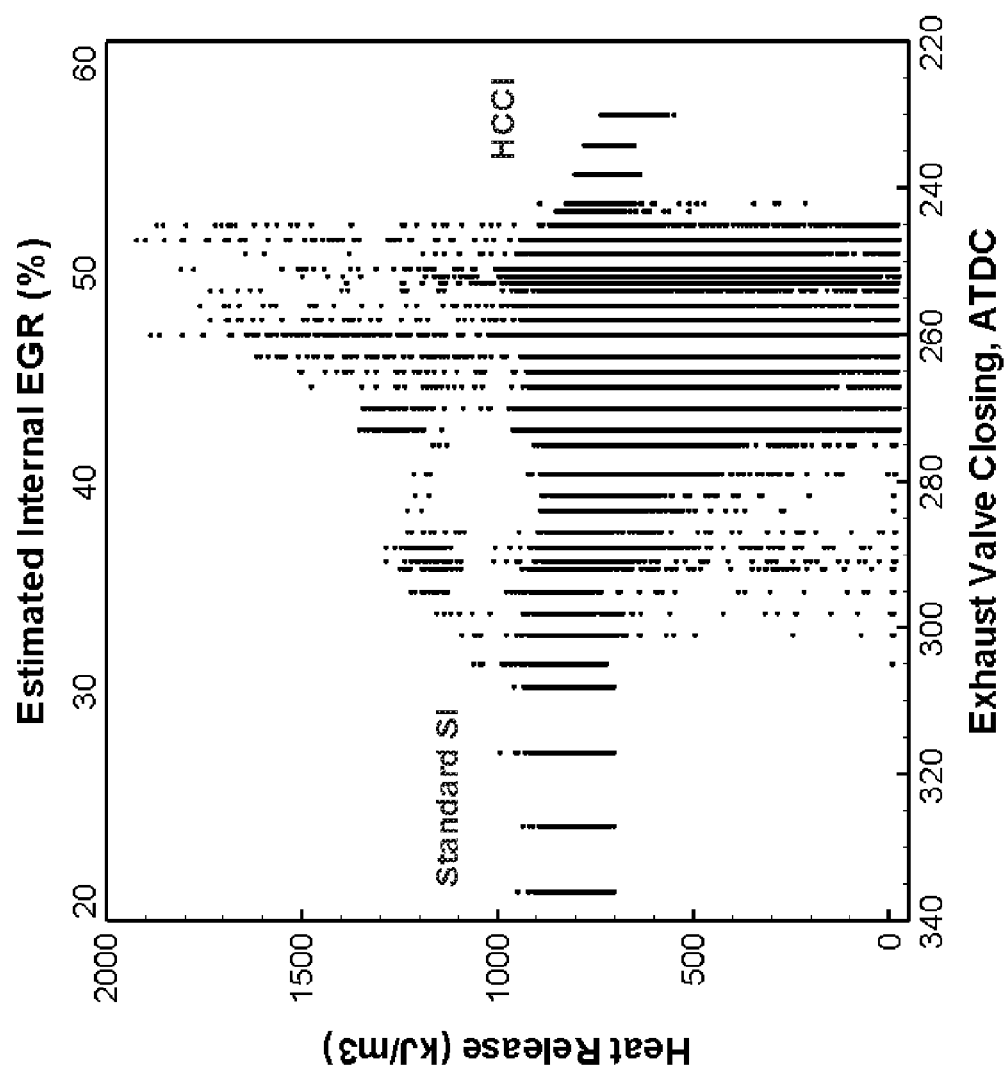
FIG. 2 is another illustration of how combustion stability deteriorates at intermediate EGR levels (between full SI and HCCI). In this case, the vertical axis indicates the amount of heat released in combustion for individual cycles. For a given intermediate EGR level, the strength of successive combustion events can vary widely, producing a broad range of observed heat release values. These variations reflect varying degrees of both SI and HCCI in each cycle. Such behavior would of course be totally unacceptable performance for a realistic engine.

FIG. 2 shows that stability and efficiency deteriorates with increasing EGR until HCCI conditions are reached. Combustion evolves between two distinct states representing SI and HCCI combustion, with increasing EGR. From chemical kinetics we know that ignition and propagation processes for both SI and HCCI are highly nonlinear. Nonlinear dynamics theory suggests that FIG. 2 represents a 'bifurcation' sequence.

Figure 3:
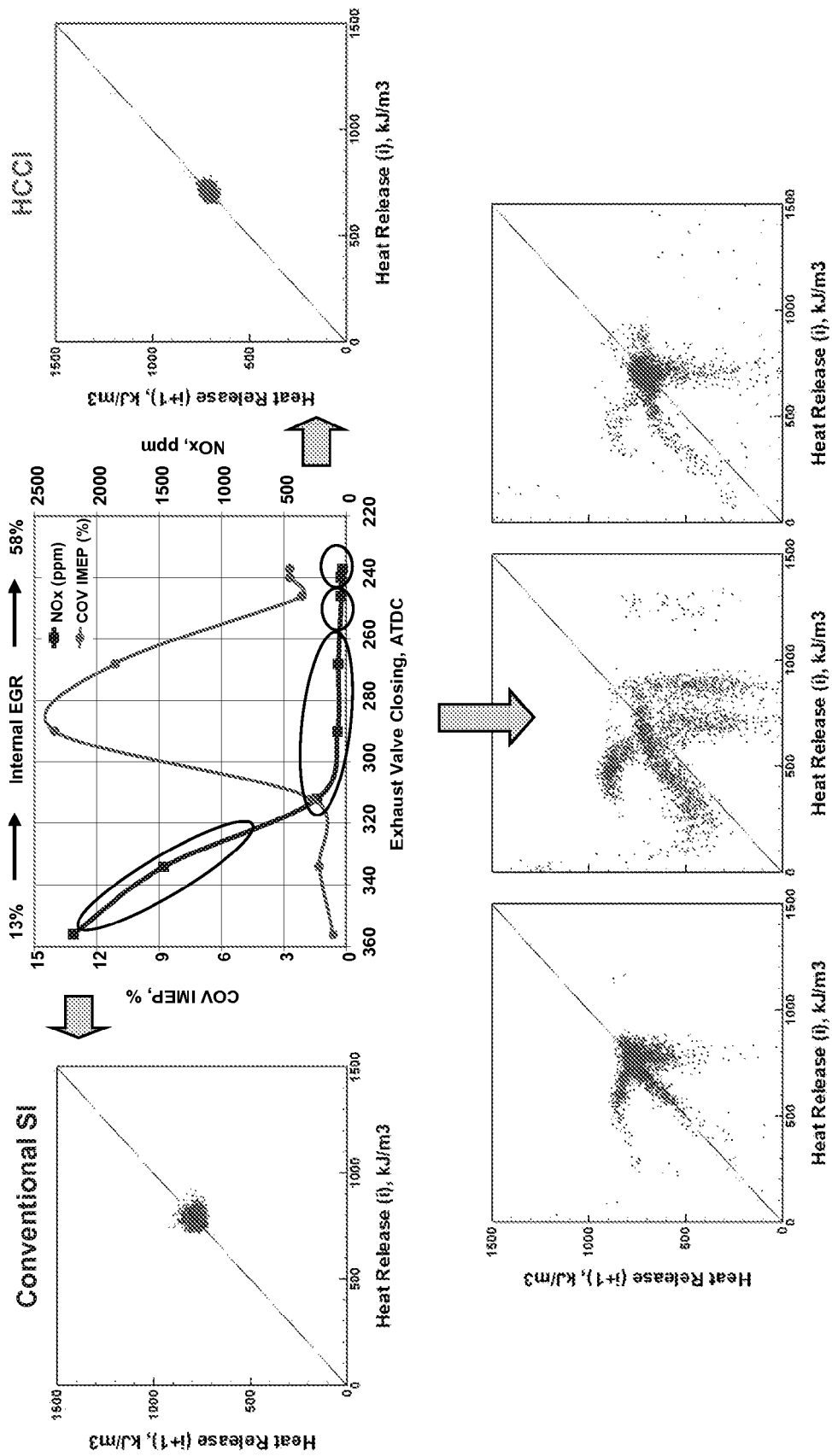
FIG. 3 includes return maps (from nonlinear theory) that reveal the deterministic patterns in the unstable combustion variations occurring at intermediate EGR levels. The presence of determinism demonstrates that it is possible to predict how the combustion will vary in the next cycle based on recent past history.
Figure 4:
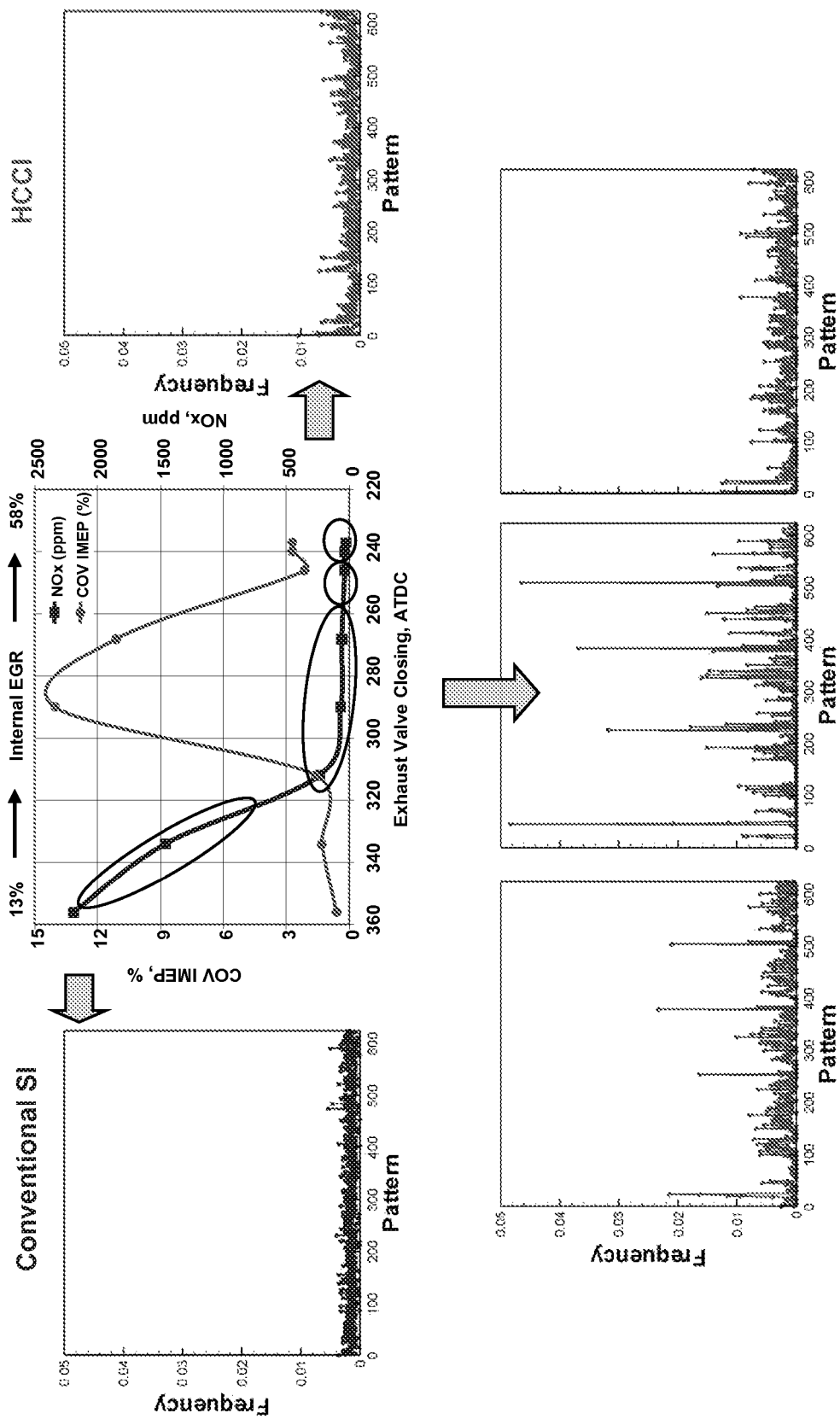
FIG. 4 includes graphs of symbol sequence histograms, which are another type of nonlinear tool for recognizing the deterministic combustion variations. Using such histograms, it is possible to precisely determine how far the SI-HCCI transition has progressed based on relative frequency of patterns in the combustion events.

In FIGS. 3 and 4, cycle-to-cycle variations exhibit non-random structure during transition from conventional SI to HCCI. Applying pattern recognition approaches revealed re-occurring sequences in the data. Some example patterns observed in the engine are shown in FIG. 5. In FIG. 5a, the engine frequently visits 3-state pattern in transition region. In FIG. 5b, the engine oscillates near a single value before entering a more complicated pattern. In FIG. 5c, the engine frequently oscillates near a single value (control point).

Figure 6:
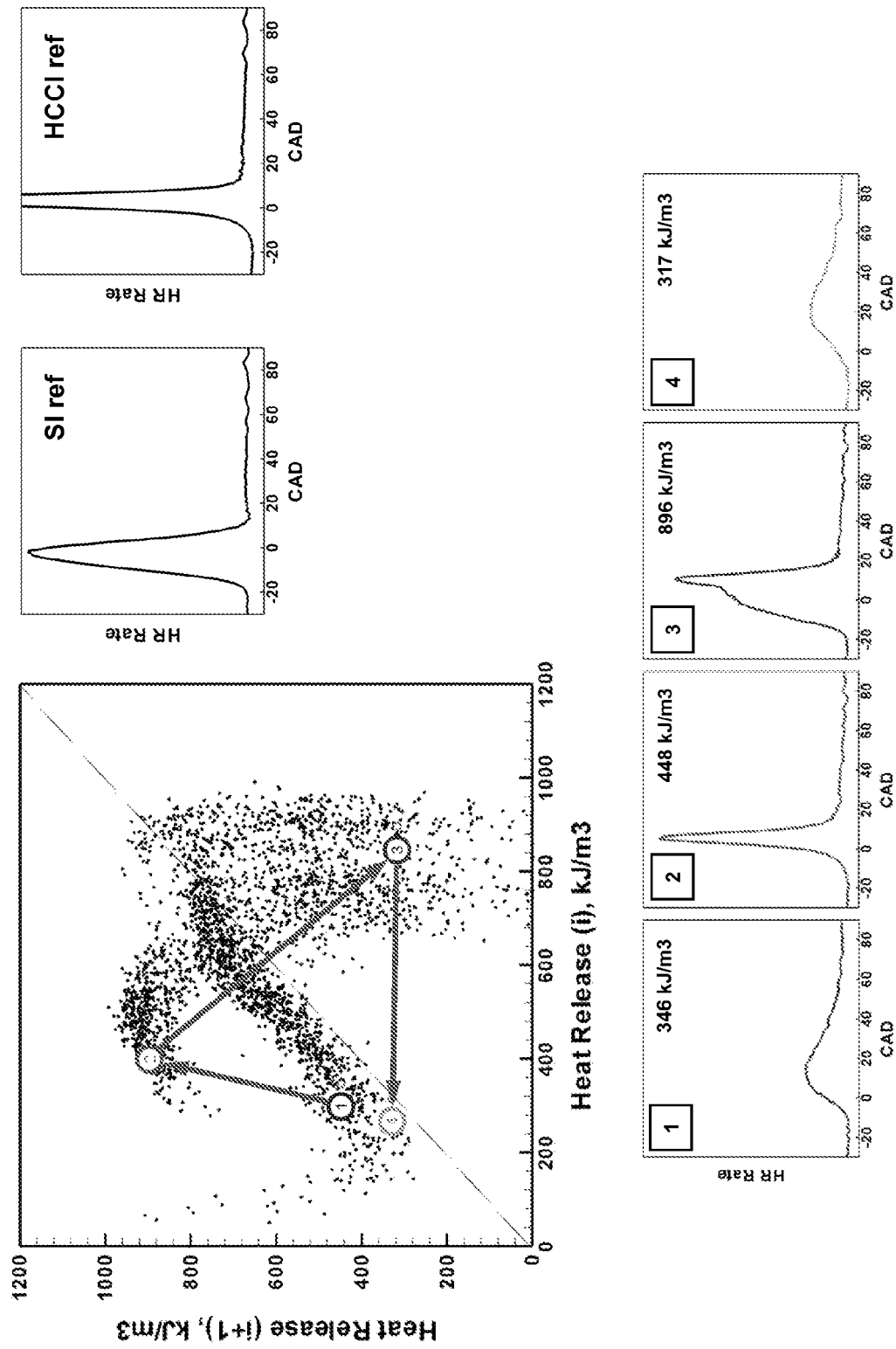
FIG. 6 includes graphs of heat release rates corresponding to specific points on the integrated heat release return maps in the SI-HCCI transition. The sequence of highlighted combustion events represents one type of undesirable cycle-to-cycle combustion oscillation. Because heat release rate is resolved at each point along the combustion path of individual cycles, it reveals details about each combustion event not visible in the integrated values. By analyzing such information, it has been revealed that the combustion oscillations are due to time varying competition between SI and HCCI combustion mechanisms. This competition is responsible for the cycle-to-cycle deterministic patterns.
Figure 7:
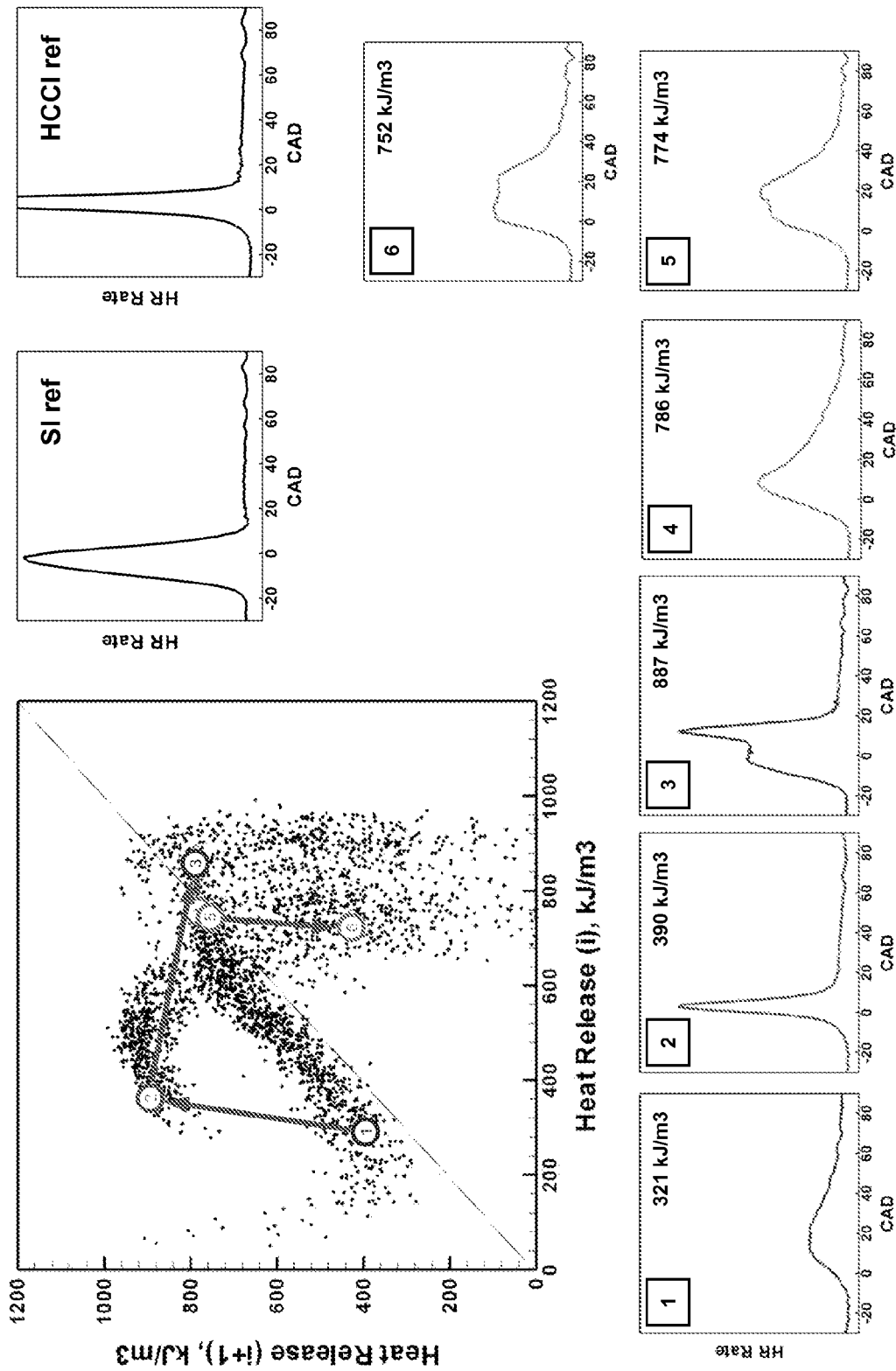
FIG. 7 is similar to FIG. 6 but reflects a different sequence of undesirable combustion events.
Figure 8:
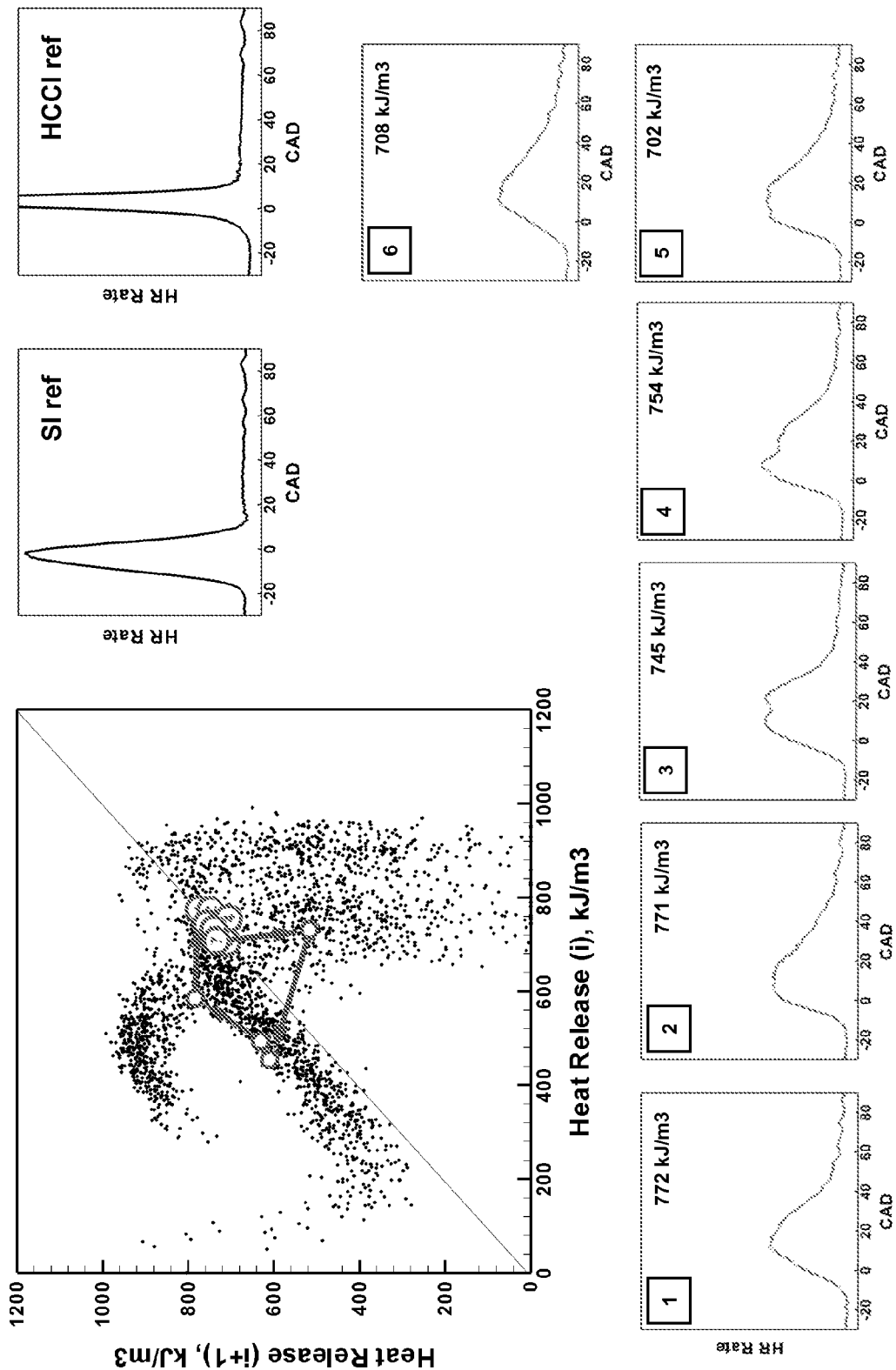
FIG. 8 illustrates the return maps and corresponding heat release rate profiles for a near-optimal sequence of combustion events. By maintaining the proper balance between SI and HCCI features through manipulation of combustion control variables such as spark timing, it should be possible to continue the near-optimal combustion over a much longer time.

FIG. 6 shows an unstable 3-state pattern frequently observed in the data. Repeatable patterns of instability are seen in the region between pure SI and HCCI. FIG. 7 shows where the combustion process enters an optimal combustion zone (i.e., stable dynamic manifold characterized by hybrid combustion) but quickly diverges and resumes an unstable trajectory. FIG. 8 shows where the combustion process converges to a hybrid combustion mode for many cycles before de-stabilizing.

Figure 9:
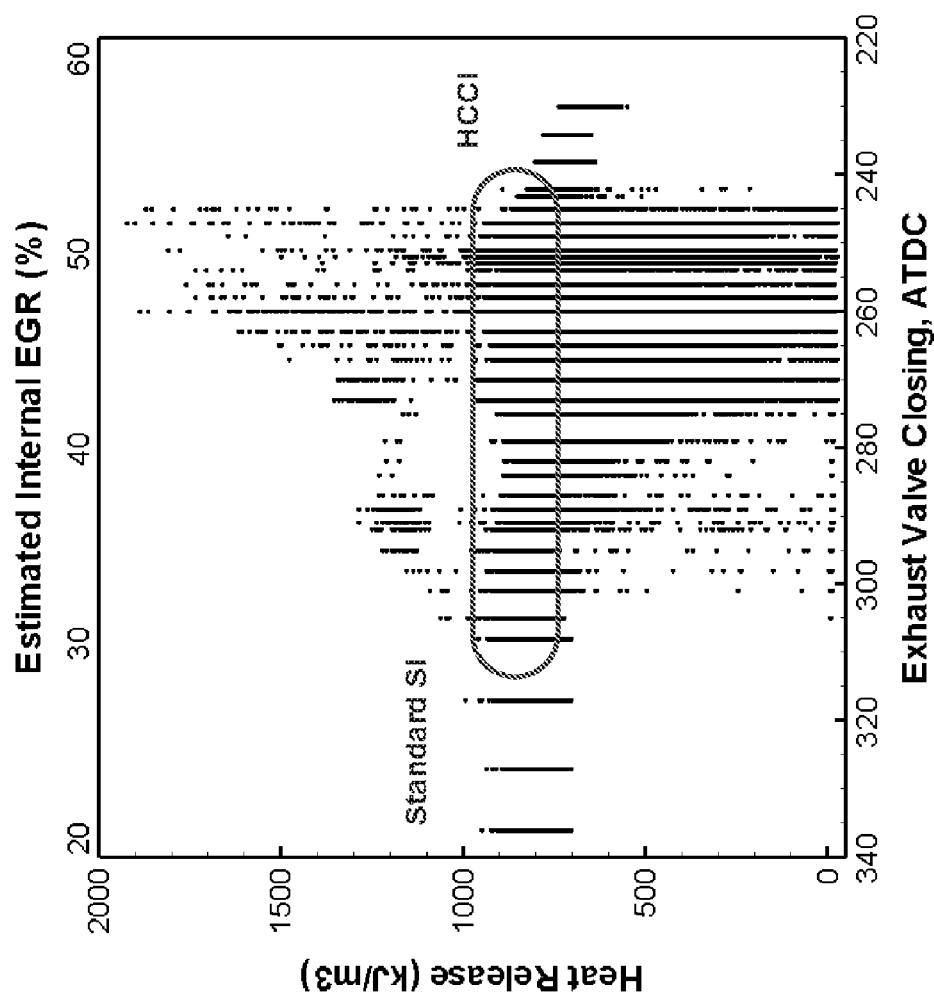
FIG. 9 reveals the near-optimal combustion amplitude in the SI-HCCI transition region that could be stabilized by proper feedback control.

The heat release profile shown in FIG. 8 is for a "stable" zone that is much different than that observed for SI and HCCI. This could be a reasonable control zone where the trajectory in and out of "stable" zone is predictable. Rate shaping via trajectory control may be possible. In FIG. 9, the stable zone is a potential region for control while transitioning or for expanding operational range. Rate shaping of combustion process with trajectory control has potential for controlling within and/or navigating the transition region. Benefits include HCCI-like NOx emissions with reduced pressure rise rates. Benefits may include HCCI-like NOx emissions with reduced pressure rise rates.

Our understanding of the SI-HCCI transition physics is based on a simple cyclic mass balance for fuel and air in the cylinder. Basic assumptions used for the mass balance are: a) Focus on single cylinder (but readily extends to multiple cylinders), b) Each cycle begins with injection of fresh fuel-air mixture into the cylinder, c) Residual (recycled) gas from previous cycle is also retained in the cylinder and mixed with the fresh fuel-air charge, d) Either as a result of the spark or compression heating, combustion of mixture occurs, releasing some fraction of the combined chemical energy of the fresh and recycled fuel, e) The combustion exhaust gases exit the cylinder, with some fraction recycled back to the next cycle as residual gas, and d) The above process continues to repeat, ad infinitum The AVL experiments on which most of the current experimental data are based, included some additional constraints; a) The as-fed fresh air-fuel charge was kept as close as possible to a stoichiometric mixture of air and indolene, b) The air-fuel mixture was port injected so that it should have been well mixed upon entering the cylinder, c) All experiments were done at fixed engine speed, which was maintained with a dynamometer d) All feedback controllers on the engine were turned off, e) As IVC and EVC were adjusted to increase residual gas (internal EGR), the throttle was also opened to maintain an approximately constant power output, and e) For many of the experimental EGR sequences, the spark ignition timing was fixed and kept on at all EGR levels (thus this was a constant parameter).

The deterministic patterns in combustion variations in the SI-HCCI transition can be modeled with both physical and statistical techniques. One simple type of physical model accounts for the fact that residual fuel and air can only come from incomplete combustion in previous cycles. The resulting cycle-by-cycle mass balance for stoichiometric fueling is:

$$mr(i+1)=(f/(1+f))*(1-CE(i))*(mf+mr(i)) \quad \text{Eqn.(1)}$$

where: $mr(i)$=mass of residual fuel-air prior to combustion in cycle I, $mf$=mass of fresh fuel-air added each cycle (constant, can be defined as 1 for convenience), $f$=residual fraction (EGR ratio)=total mass of residual gas/$mf$ (constant), $CE(i)$=combustion efficiency of ith cycle=fraction of fuel-air consumed (0-1); complex function of in-cylinder conditions and fuel properties (this is where interesting nonlinearities appear)

Note 1: Residual gas contains both unburned fuel-air and burned exhaust

Note 2: Total mass of gas in cylinder in each cycle is $mf*(1+f)$. If we keep $mf$ constant as $f$ increases, the total in-cylinder gas inventory increases. This was achieved in the AVL experiments by opening the throttle.

Note 3: For stoichiometric fueling air and fuel consumption follow a 1:1 relationship, and a single number can be used for both. With non-stoichiometric fueling, it is necessary to track air and fuel separately.

Applying the simple mass balance model to experimental data requires some additional steps. Experimental measurement data typically include a) $mf$ (mass of fresh fuel fed/cycle) and b) $f$ (mass of residual gas/mass of fresh charge=level of EGR). Also, it is necessary to observe integrated heat release values ($HR(i)$) for thousands of contiguous cycles at varying levels of $f$ (e.g., 0-0.6). Generally, it is not necessary to measure $mr(i)$.

Using these data requires the following additional assumptions:

$$\text{Integrated heat release } HR(i)=CE(i)*(mf+mr)/Q \quad \text{Eqn.(2)}$$

$Q$=proportionality constant=nominal heating value of fresh+residual fuel The heat value of mix is approximately constant at a given EGR condition. It is possible to use the previous assumptions to make inferences about $mr(i)$ from the experimental $HR(i)$ data. Setting $mf=1$, Eqns. 1 and 2 can be rewritten as $$mr(i+1)=(f/(1+f))(1+mr(i)-HR(i)/Q) \quad \text{Eqn.(3)}$$

Thus if one knows $mr(i)$, $Q$, and $HR(i)$ it is possible to estimate $mr(i+1)$ from Eqn. 3 and then estimate $CE(i)$ from Eqn.(2). Although one does not know $mr(i)$ a priori at the beginning of an experiment, it is possible to guess an initial value and carry out the iteration above, always using the measured $HR(i)$ values in each successive cycle. One also does not usually know $Q$ either, but it is possible to select a value of $Q$ such that $CE$ is always$<=1$ for all the observed cycles. Regardless of the initial guess for $mr(i)$ and $Q$, repeated iteration with the experimental $HR(i)$'s will produce a convergent sequence of estimated $mr(i+1)$ after several cycles because of the dissipative nature of the model. The ability to reconstruct the $mr(i)$ from measured $HR(i)$ is a key discovery and is based on the high dissipation in engines.

Figure 10:
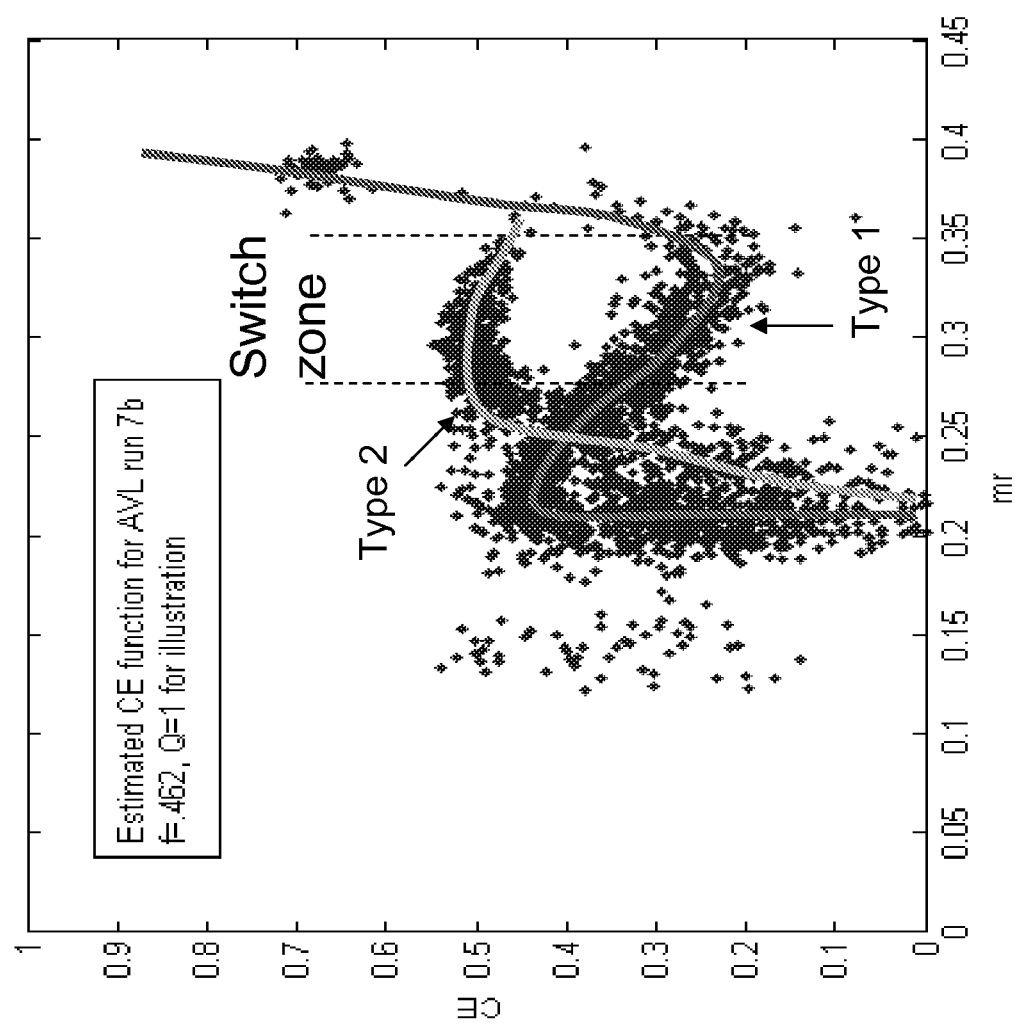
FIG. 10 illustrates how a simplified combustion rate function (referred to as Combustion Efficiency or CE) can be used to quantitatively describe the competition between SI and HCCI combustion mechanisms at intermediate EGR levels.

Following the procedure described above, it is possible to estimate $mr(i)$ and $CE(i)$ consistent with observed $HR(i)$. Cycle-by-cycle analyses reveal combustion shifting between two characteristic types of combustion (labeled type 1 and type 2 in FIG. 10). For type 1 there is a characteristic 'retrograde' region where $CE$ falls with increasing $mr$ (may be related to so-called negative temperature coefficient). Type 2 only occurs after a type 1 event falling within the 'switch zone'. After 1 iterate of type 2, combustion returns to type 1. For both types of combustion, very low $mr$ causes a shutdown in combustion. For $mr$ above the upper boundary of the switch zone, type 1 behavior takes over. All of these behaviors can be fit to simple polynomial functions that predict $CE(i)$ for any cycle based on $mr(i)$ and $mr(i-1)$.

Cycle-by-cycle analyses of the AVL data also suggest important trends with increasing EGR. It appears that $Q$ (the effective heating value of the combined fresh+residual fuel) slowly diminishes with EGR. The diminishing $Q$ suggests that residual fuel is actually becoming partially oxidized, thus lowering its effective heating value. The presence of these partially oxidized fuel states may be related to the combustion suppression effect in the type 1 retrograde region. Excessive accumulation of 'aged' (2nd pass) oxidized species may also be the cause of the switch from type 1 to type 2 combustion.

At each EGR level, the engine reaches a nominal level for the mean $mr$ and $Q$, and the $CE$ behavior (i.e., the type 1 and type 2 functions) then follows the same basic pattern about that nominal state. Thus is appears possible to use the same basic functional form for the type 1 and type 2 $CE$ values as long as the impact of $f$ on $Q$ is accounted for. Beyond a high critical value of EGR, $mr$ becomes very small as the HCCI mode begins to fully dominate.

The previous observations can be interpreted in terms of a global kinetic model for combustion. Empirical experience over many years and for many engines has shown that the combustion process can be approximated in terms of the standard Wiebe function as;

$$x_b=1-\exp[-a*((\theta-\theta_0)/\Delta\theta)^{b+1}] \quad \text{Eqn.(4a)}$$

where $x_b$ is the fractional degree of fuel burnout, a and b are the Wiebe parameters, $\theta$ is the crank angle, $\theta_0$ is the angle at start of combustion, and $\Delta\theta$ is the number of degrees over which combustion occurs.

When engine speed is constant, IVC and EVO are kept fixed, and we integrate over the entire combustion cycle so that $$\theta-\theta_0=\Delta\theta, \quad \text{Eqn.(4b)}$$

becomes $$CE(i)=1-\exp[-a]=1-\exp[-k*\Delta t] \quad \text{Eqn.(5)}$$

where k is a global reaction rate constant and
Δt is the burn time.

Experience with the AVL data has demonstrated that it is possible to fit ln(a) or ln(k) as polynomial functions of mr also. For type 1;

$$ln(a)=b*mr(i)^3+c*mr(i)^2+d*mr(i)+e$$

appears to work well, and for type 2

$$ln(a)=b*mr(i)^2+c*mr(i)+d$$

appears to work up to the edge of the switch zone.

Iterating the simple mass balance model with the CE functions described previously can replicate the observed cycle-by-cycle behavior when stochastic noise is included. The nonlinear model teaches;

$$mr(i+1)=(f/(1+f))*(1-CE(i))*(1mr(i))f=f_0+gn(0,\sigma), gn(0,\sigma)$$  Eqn.6

=Gaussian distributed random noise, with mean 0, std. dev.σ

$$CE(i)=g(mr(i),mr(i-1))$$

where g is a complex function as taught previously

Figure 11B:
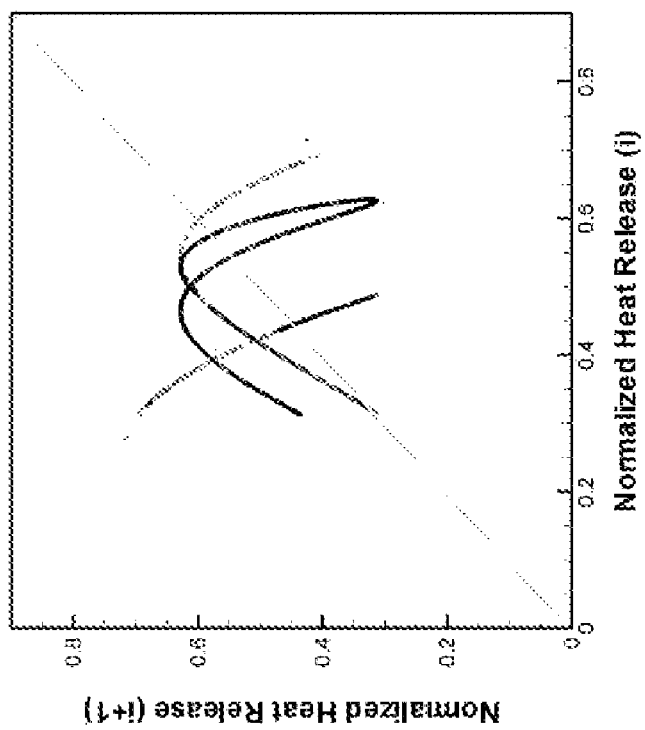
FIG. 11b illustrates just the deterministic part of the model without the presence of noise.
Figure 11A:
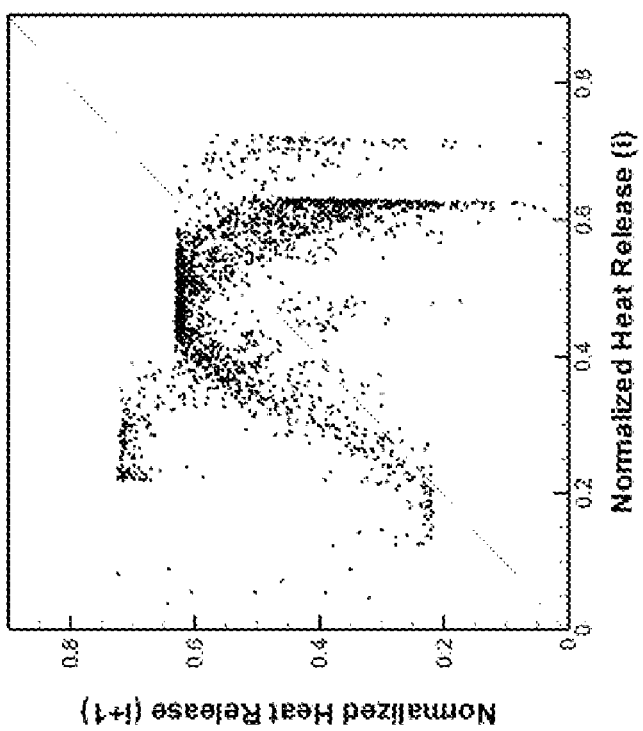
FIG. 11a illustrates a return map predicted by such a model in the presence of stochastic noise (as would be the case in a real engine).

It appears that the simple mass-balance model, as seen in FIG. 11, can be very useful for revealing underlying determinism (noise is eliminated). FIG. 11a shows normalized heat release with random noise added. FIG. 11b shows the same data with noise removed. The success of the above leads to two important observations; 1) With noise removed, possible control targets (e.g., fixed points) become visible, and 2) It should be possible to relate this type model to explain/correlate fuel chemistry and engine design effects on SI-HCCI transition. The success of the above leads to two important observations: 1) With noise removed, possible control targets (e.g., fixed points) become visible and 2) It should be possible to relate this type model to explain/correlate fuel chemistry and engine design effects on SI-HCCI transition. Fixed points are special states derived from the mass balance model that are especially useful for control and understanding. At a fixed point, the combination of conditions in the cylinder is such that the same degree of combustion and same residual fuel-air occur repeatedly. Under the above constraint $$mr(i+1)=mr(i)=mr(fp)\text{ and Eqn.(1) yields}$$

$$mr(fp)=f*(1-CE(fp))/(1+f*CE(fp))=f*(1-HR(fp)/Q)$$  Eqn.(7a)

$$CE(fp)=(HR(fp)/Q)/(1+f*(1-HR(fp)/Q))$$  Eqn.(7b)

where fp denotes values for the fixed point.

Heat release fixed points, HR(fp), can be determined directly from sequential HR data using special statistical techniques. Because of the complexity of the CE function, it is possible to have multiple fixed points.

Summary of key findings resulting from studies of the simple cycle-by-cycle mass balance model; 1) It is possible to infer cycle resolved fuel-air residual and degree of combustion from consecutive cyclic heat release data, 2) The heating value of residual fuel appears to diminish with increasing EGR, suggesting increased partial oxidation, 3) Recycled fuel-air affects global combustion efficiency in a complex way, suggesting a combination of propagating flame and HCCI-like reaction over a range of EGR between about 10 and 60%, 4) Combustion at moderate EGR levels seems to occur in two distinct modes (referred to as type 1 and 2), 5) Type 1 combustion is more common and involves a retrograde response to residual fuel over a wide range of residual concentration, 6) Type 2 combustion is less common and seems to occur only when there have been repeated low energy type 1 events. All the above findings can be captured by a simple mapping model that relates global reaction kinetics to the residual composition.

A statistic-based algorithm for predicting engine behavior during SI-HCCI mode transition was developed and tested using data from experiments conducted with an AVL single-cylinder research engine equipped with a fully variable valve actuation system (VVA). The algorithm was enacted using Matlab code. The algorithm uses the combustion performance of the previous m−1 cycles and a statistical analysis of the recent history of combustion performance to predict the combustion behavior during the next engine cycle. Accurate prediction of future behavior allows for the possibility of control through application of an appropriate control action to steer the engine toward desired behavior. The algorithm requires real-time knowledge of some metric of combustion performance for each cycle (e.g., cycle-integrated heat release from cylinder pressure measurements). A history of several hundred to several thousand consecutive cycles (enough for statistical significance) of the combustion metric at a given, uncontrolled engine operating point is needed to develop a statistical database for that operating point.

The basic approach for extracting a dynamical model from the data relies on estimation of the attractor using Takens' embedding theorem. Typically, embedding lag=1cycle and embedding dimension, m, is increased until the reconstructed trajectory is fully resolved (prediction uncertainty is minimized). In the attractor reconstruction process, we have recognized that at sufficiently large m, the attractor forms a hypersurface in the reconstructed phase space. This allows one to approximate the attractor as a complex surface and use existing (highly optimized) surface interpolation algorithms to define the function.

An m-dimensional surface map is then created that provides a functional relationship between the current-cycle combustion metric and the metrics for the previous m−1 cycles (i.e., cm(m)=f(cm(1),cm(2), . . . ,cm(m−1)). Once the surface map has been created for a given operating point, it can be used to make real-time predictions of the next-cycle combustion performance based on the metric values for the previous m−1 cycles. Control may be enacted by applying an appropriate perturbation to steer the engine from the predicted behavior toward the desired behavior. Control over a range of operating points or during transient operation may be enacted by creating a series of surface maps at different operating conditions and utilizing an appropriate interpolation strategy between maps.

There are a number of techniques that can be used to create the m-dimensional surface map from the statistical database. Two such methods are described below as examples.

Method 1: The range of combustion-performance metric values in the statistical database is divided into n number of discrete divisions or 'bins'. Each cycle in the database is assigned a 'bin number' from 1 to n based on the value of the combustion metric for that cycle and which of the discrete 'bins' that metric value falls within. Each cycle in the database is assigned a 'pattern' which describes the path that lead to the current cycle. The 'pattern' is created by combining the 'bin number' of the m−1 number of previous cycles (for example, using m=4, a 'pattern' for cycle #4 of '4-6-1', indicates that the metric for cycle #1 falls in bin #4, cycle #2 is in bin #6, and cycle #3 is in bin #1). There are $n^{m-1}$ possible unique 'patterns'. The database is then used to construct a discrete surface map which provides a single predicted value of the combustion metric for each unique 'pattern'. This is accomplished by averaging the combustion metric (or 'bin number') for all cycles in the database which have the same 'pattern'. Non-discrete predictions can be obtained by interpolation.

Method 2: A multi-dimensional fitting routine (such as Matlab's 'griddatan') may be used to directly construct the surface map for $cm(m)=f[(cm(1),cm(2),\ldots,cm(m-1)]$ from the statistical database.

FIG. 12a and 12b represent predictions of observed data derived from surface maps and are defined by:

$$hr(i)=f[hr(i-1), hr(i-2), hr(i-3)]$$

Shown are 1-step-ahead predictions of experimental engine data using a 4-D surface map constructed from experimental data collected at the same operating point on the previous day. The combustion-performance metric used in this example is cycle-integrated heat release of cylinder pressure measurements. Implementation was with Method 2 using 20 bins.

Figure 13B:
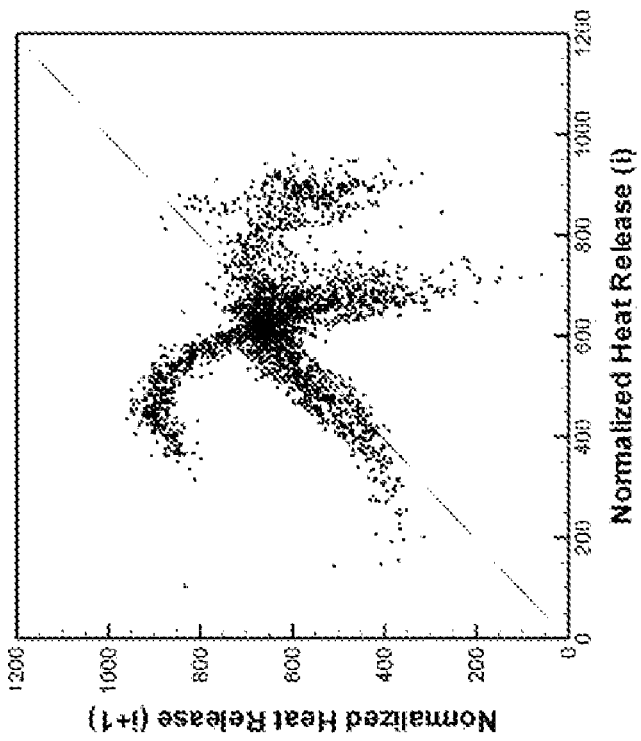
FIG. 13 illustrates how a return map produced by a simple statistical model (b) compares with experimental observations (a) for an intermediate EGR level.
Figure 13A:
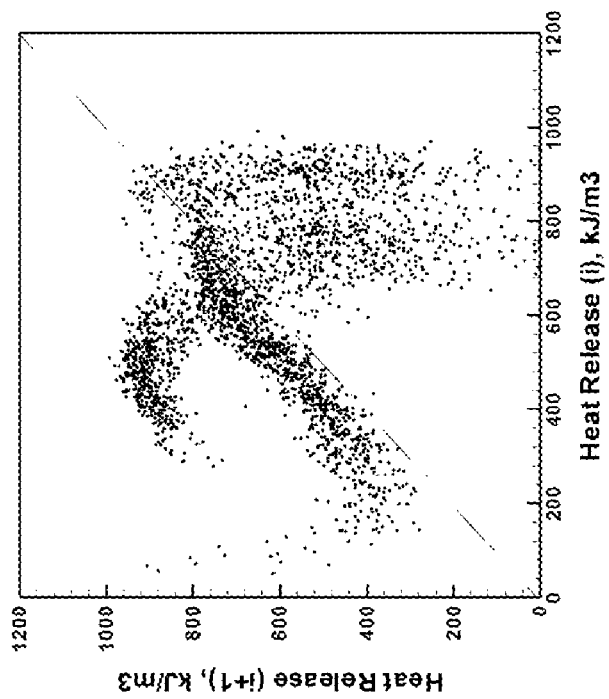
Figure 14:
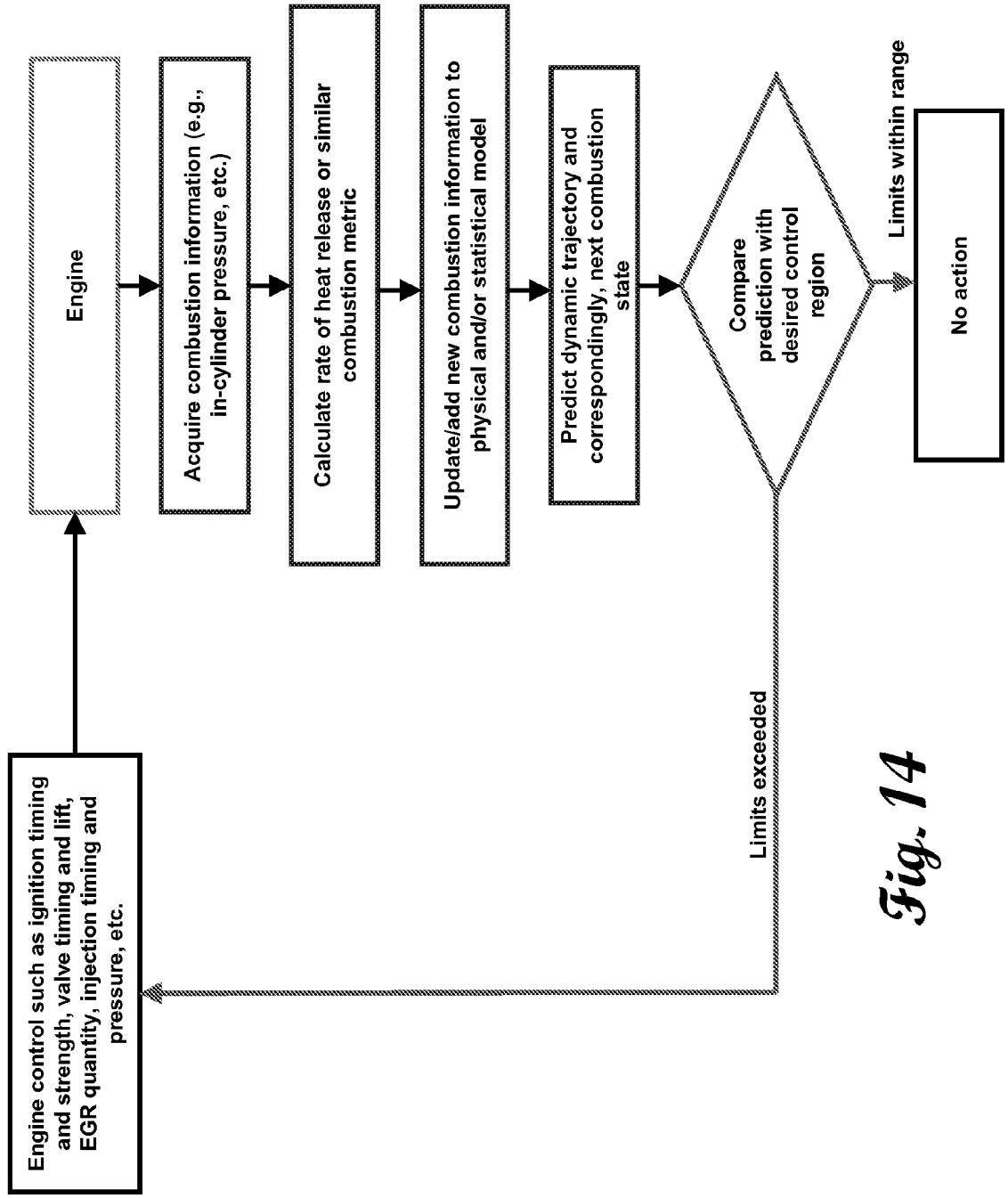
FIG. 14 is a logic flow diagram of the software decision process.

FIG. 13a shows phase space reconstruction for experimental data. FIG. 13b is the statistical-based reconstruction with random perturbation added to the heat release rate.

While there has been shown and described what are at present considered the preferred embodiments of the invention, it will be obvious to those skilled in the art that various changes and modifications can be made therein without departing from the scope.

We claim:

1. A device for achieving stable, optimal mixtures of SI and HCCI combustion in internal combustion engines comprising:
   means for characterizing the combustion process based on combustion process measurements,
   means for determining the ratio of conventional and HCCI combustion,
   means for determining the state of trajectory for consecutive combustion processes,
   means for determining subsequent combustion process modifications using said information from preceding combustion events to steer the engine toward desired behavior.

2. The device of claim 1 wherein said combustion process measurements are selected from the group consisting of direct and inferred.

3. A device of claim 1 wherein said combustion process measurements is at least one parameter selected from the group consisting of in-cylinder pressure, carbon dioxide, carbon monoxide, hydrocarbons, nitrogen oxides, oxygen, net heat release over the entire power stroke, and indicated mean effective pressure over the entire power stroke.

4. The device of claim 1 wherein said state of trajectory further comprises at least one parameter selected from the group consisting of mass of residual fuel-air, mass of fresh fuel-air, residual fraction, combustion efficiency, integrated heat release, proportionality constant, heat release fixed points, and statistic based algorithms.

5. The device of claim 4 wherein said residual fraction further comprises an EGR ratio.

6. The device of claim 4 wherein said statistic based algorithms further comprise at least one method selected from the group consisting of bins and multi-dimensional fitting.

7. The device of claim 1 wherein said combustion process modifications further comprises at least one action selected from the group consisting of modifying ignition timing and strength, valve timing and lift, EGR quantity, and injection timing and pressure.

8. A method of achieving stable, optimal mixtures of SI and HCCI combustion in internal combustion engines comprising the steps of:
   characterizing the combustion process based on combustion process measurements,
   determining the ratio of conventional and HCCI combustion,
   determining the state of trajectory for consecutive combustion processes,
   determining subsequent combustion process modifications using said information from preceding combustion events to steer the engine toward desired behavior.

9. The method of claim 8 wherein said combustion process measurements are selected from the group consisting of direct and inferred.

10. A method of claim 8 wherein said combustion process measurements is at least one parameter selected from the group consisting of in-cylinder pressure, carbon dioxide, carbon monoxide, hydrocarbons, nitrogen oxides, oxygen, net heat release over the entire power stroke, and indicated mean effective pressure over the entire power stroke.

11. The method of claim 8 wherein said state of trajectory further comprises at least one parameter selected from the group consisting of mass of residual fuel-air, mass of fresh fuel-air, residual fraction, combustion efficiency, integrated heat release, proportionality constant, heat release fixed points, and statistic based algorithms.

12. The method of claim 11 wherein said residual fraction further comprises an EGR ratio.

13. The method of claim 11 wherein said statistic based algorithms further comprise at least one method selected from the group consisting of bins and multi-dimensional fitting.

14. The method of claim 8 wherein said combustion process modifications further comprises at least one action selected from the group consisting of modifying ignition timing and strength, valve timing and lift, EGR quantity, and injection timing and pressure.

* * * * *